US008122085B2

(12) United States Patent
Midgley

(10) Patent No.: US 8,122,085 B2
(45) Date of Patent: Feb. 21, 2012

(54) EMAIL TRANSACTION SYSTEM

(75) Inventor: Nicholas J. Midgley, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 1825 days.

(21) Appl. No.: 11/255,411

(22) Filed: Oct. 20, 2005

(65) Prior Publication Data

US 2006/0168058 A1 Jul. 27, 2006

(30) Foreign Application Priority Data

Dec. 3, 2004 (GB) .................................. 0426509.6

(51) Int. Cl.
G06F 15/16 (2006.01)

(52) U.S. Cl. ........................................ 709/206; 709/219

(58) Field of Classification Search ........... 709/204–207
See application file for complete search history.

(56) References Cited

U.S. PATENT DOCUMENTS

| 5,659,298 | A | * | 8/1997 | Brooks et al. | 340/7.3 |
| 6,823,380 | B1 | * | 11/2004 | Nace et al. | 709/224 |
| 6,865,594 | B1 | * | 3/2005 | Belissent et al. | 709/206 |
| 2002/0026484 | A1 | | 2/2002 | Smith | |
| 2002/0087694 | A1 | * | 7/2002 | Daoud et al. | 709/226 |
| 2003/0028580 | A1 | | 2/2003 | Kucherawy | |
| 2004/0221011 | A1 | | 11/2004 | Smith et al. | |
| 2005/0091323 | A1 | * | 4/2005 | Smith et al. | 709/206 |
| 2006/0031307 | A1 | * | 2/2006 | Bhatia | 709/206 |

FOREIGN PATENT DOCUMENTS

| JP | 2001144799 A | * | 5/2001 |
| TW | I224916 B | | 12/2004 |

OTHER PUBLICATIONS

Luke McDowell et al; Semantic Email; 2004, ACM, 1-58113-844-X/04/0005.;244-254.*
Letter from IBM Taiwan which indicates that the date of the issued Office Action is Apr. 15, 2011.

* cited by examiner

Primary Examiner — Ashok Patel
Assistant Examiner — Evans Desrosiers
(74) Attorney, Agent, or Firm — Scully, Scott, Murphy & Presser, P.C.; Ronald A. Kaschak

(57) ABSTRACT

The present invention provides a method and a system in which, a determination is made in order to determine whether a destination mail server is able to process a number of emails associated with a distribution list. By requesting performance metrics for each destination server, analysis is performed to understand the processing capacity of the destination server. In response to the determined processing capacity of the destination mail server, and the time in which the emails must be sent by, the emails are either sent, or a negotiation is performed with each of the destination servers, to determine an available time. Therefore, each destination server can control the time in which it receives and processes the emails. Therefore, avoiding large amounts of emails 'hitting' the destination servers, at a time when the destination servers are already very busy and available processing capacity is of a premium.

16 Claims, 12 Drawing Sheets

EMAIL TRANSACTION SYSTEM

BACKGROUND OF THE INVENTION

1. Field of the Invention

The invention relates to the field of network computing and in particular to an email transaction system for determining a time period, based on geographical variables, in which to send an email to a plurality of email addresses identified within a distribution list within a high volume email transaction system.

2. Background Art

Many organisations use emailing systems for their internal and external communications. Often, emails are used to communicate organisational changes, up and coming events, or news items etc, to many different people throughout the organisation. In many organisations this can often mean sending email communications to employees located in a different country or in a different time zone.

Sending an email to a large number of people can have a severe impact on the network and the mailing servers that are required to receive and process the emails. In a busy organisation, email servers are constantly bombarded with one email after another. At certain times of the day, an email server may experience a higher volume of network traffic than at other times of the day. For example, at lunchtime on a Friday, more people may send emails as they prepare for the weekend break, or as a new advertising campaign is launched, the marketing director may wish to send out an email via a distribution list, informing customers of an imminent launch.

Therefore the work patterns of employees at certain times of the day, weeks or months may affect the ability of many networks and mail servers to handle the increased network traffic. In most email client applications, when sending an email, the sender can select a number of delivery options, for example, high priority, medium priority or low priority. By selecting low priority, this will allow the email to be sent to the sender's mail server and the senders mail server will 'hold' the email until such a time that the organisations deems that it is appropriate to send the email. For example, after 19:00 hours. This provides an advantage in that an organisation may balance the amount of emails that are sent at peak times of the day. Some organisations may even edict that no emails may be sent to a distribution list larger than, for example, 100 recipients in normal working hours. Often individuals may overcome this problem by separating out the distribution list into smaller distribution lists, for example, in multiples of twenty, in order to communicate urgent emails.

A further problem occurs when sending an email to recipients in a distribution list that are resident in different countries or within different time zones. For example, when sending an email within off-peak hours (20:00 hours to 7:00 hours) from a mail server located within the UK to a number of recipients who are located in Australia; the time at which the email is received for processing by the recipients email server in Australia may be determined as peak time. This therefore creates a further burden on the network and mail servers at the recipient's location.

Mailing systems are often designed depending on the organisations needs. Typically, such systems may comprise a singular machine implementation or a multiple machine implementation. In a single machine implementation the hardware and software installed on the single mailing server may prevent the mailing system from quickly and efficiently handling a large distribution list. For example, due to limitations in processing capacity, disk space and the operating system. Also, limitations may exist in the number of entries within the distribution list which may be processed by the mailing software.

To overcome the limitations of a single machine implementation, multiple machine implementations are used in order to speed up the process of partitioning a distribution list into smaller lists for processing by many other servers. This type of arrangement requires a substantial manual effort in deciding the most appropriate manner in which to partition a distribution list and further determining which servers should process the partitioned distribution list. Both single and multiple machine implementations are inefficient and are unable to manage increases in network traffic, bounced email and fluctuations in activity levels of emails received by the mailing servers.

US patent application, publication number US 2002/0026484 A1, describes method and system for processing a high volume of electronic mail. The method and system employs several groups of servers in order to more efficiently handle the processing and transmission of messages to large numbers of recipients. The groups of servers are categorised as A and B servers. The A servers provide storage for databases containing electronic mailing lists. The B servers, employed under the control of the A servers, perform the mass delivery of the electronic mail messages. A list is identified of available servers. For each server within the list, the system checks to see if it has already allocated processes and started delivery through these servers. If this has not occurred, the system attempts to allocate processes by contacting a remote server and attempting to reserve as many resources as possible.

Further, US 2002/0026484 A1 calculates the shortest path to a destination mail server using performance information derived from a network PING and a trace route to calculate the number of network hops. It then recalculates this on an on-going basis to modify its mail processing dynamically and only uses the information to select a set of sending servers which are closest to the recipient's servers.

US patent application, publication number US 2002/0026484 A1 does not solve the problem of a number of mail servers interacting within a collaborative nature, i.e. multiple mail systems wishing to transmit high volumes of email in a collaborative way and therefore two mail servers could flood the same destination mail servers with a large number of emails.

Therefore there is a need within the prior art for a method and system to alleviate the aforementioned problems.

SUMMARY OF THE INVENTION

Viewed from a first aspect, the present invention provides a method for determining a time period in which to send an email to a plurality of email addresses, each of the email addresses being associated within a distribution list and the email being sent to at least one destination server associated with each of the email addresses, the method comprising: receiving a plurality of email addresses associated with a distribution list, each email address comprising an attribute, the attribute pertaining to a requested time period in which to send the email to each of the email addresses; for each email address, identifying the destination server and requesting performance metrics indicative of the capacity of the identified destination server to receive the or each of the emails; analysing each of the performance metrics to determine whether, the identified destination server is able to receive the or each of the emails within the requested time period; and in dependence of the identified destination server not being able to receive each of the emails, negotiating a time period in which the identified destination server can receive the or each of the emails.

Advantageously, the present invention provides a method and a system in which, a determination is made in order to determine whether a destination mail server is able to process a number of emails associated with a distribution list. By requesting performance metrics for each destination server, analysis is performed to understand the processing capacity of the destination server. In response to the determined processing capacity of the destination mail server, and the time in which the emails must be sent by, the emails are either sent, or a negotiation is performed with each of the destination servers, to determine an available time. Therefore, each destination server can control the time in which it receives and processes the emails. Therefore, avoiding large amounts of emails 'hitting' the destination servers, at a time when the destination servers are already very busy and available processing capacity is of a premium. Each mail server not only manages its outgoing emails but is also negotiating with other mails servers requesting the mail server to receive a number of emails.

Preferably, the present invention provides a method wherein, on receiving the plurality of email addresses associated with the distribution list, each email address is cross matched against a list of email addresses stored in a directory service to ensure that each of the email addresses is a valid email address.

Preferably, the present invention provides a method wherein on identifying the destination server, a determination is performed to identify whether; the identified destination server is part of an identified mail domain.

Preferably, the present invention provides a method, wherein the identified mail domain is defined by a directory service.

Preferably, the present invention provides a method, wherein the identified mail domain identifies which destination servers the performance metrics are requested from.

Preferably, the present invention provides a method, where on identification of the destination server, a determination is performed to determine a priority order for each of the email address, in response to a requested priority and the identified destination server.

Preferably, the present invention provides a method, wherein on negotiation of an alternative time period, a message is transmitted to the destination server requesting an available time period.

Preferably, the present invention provides a method, wherein after a predetermined number of unsuccessful attempts at requesting an available time period, the email is sent to each of the plurality of email addresses.

Viewed from a second aspect, the present invention provides a system for determining a time period in which to send an email to a plurality of email addresses, each of the email addresses being associated within a distribution list and the email being sent to at least one destination server associated with each of the email addresses, the system comprising: a receiver component, receiving a plurality of email addresses associated with the distribution list, each email address comprising an attribute, the attribute pertaining to a requested time period in which to send the email to each of the email addresses; a prioritisation engine for identifying for each email address, the destination server and requesting performance metrics indicative of the capacity of the identified destination server to receive the or each of the emails; the prioritisation engine analysing each of the requested performance metrics to determine whether, the identified destination server is able to receive the or each of the emails within the requested time period; and a negotiation component for negotiating a time period in which the identified destination server can receive the or each of the emails, in dependence of the identified destination server not being able to receive each of the emails.

Preferably, the present invention provides a system, wherein on receiving the plurality of email addresses associated with the distribution list, a validator component matches each email address against a list of email addresses stored in a directory service to ensure that each of the email addresses is a valid email address.

Preferably, the present invention provides a system wherein on identifying the destination server, a validator component determines whether the identified destination server is part of an identified mail domain.

Preferably, the present invention provides a system wherein the identified mail domain is defined by a directory service.

Preferably, the present invention provides a system, wherein the identified mail domain identifies which destination servers the performance metrics are requested from.

Preferably, the present invention provides a system, where on identification of the destination server, the prioritisation engine determines a priority order for each of the email address, in response to a requested priority and the identified destination server.

Preferably, the present invention provides a system, wherein on negotiation of an alternative time period, the negotiation component generates a message for transmitting to the destination server requesting an available time period.

Preferably, the present invention provides a system, wherein after a predetermined number of unsuccessful attempts at requesting an available time period, the negotiation manager transmits the email to each of the plurality of email addresses.

BRIEF DESCRIPTION OF THE DRAWINGS

Embodiments of the invention are described below in detail, by way of example only, with reference to the accompanying drawings in which.

DETAILED DESCRIPTION OF THE PRESENT INVENTION

Figure 1:
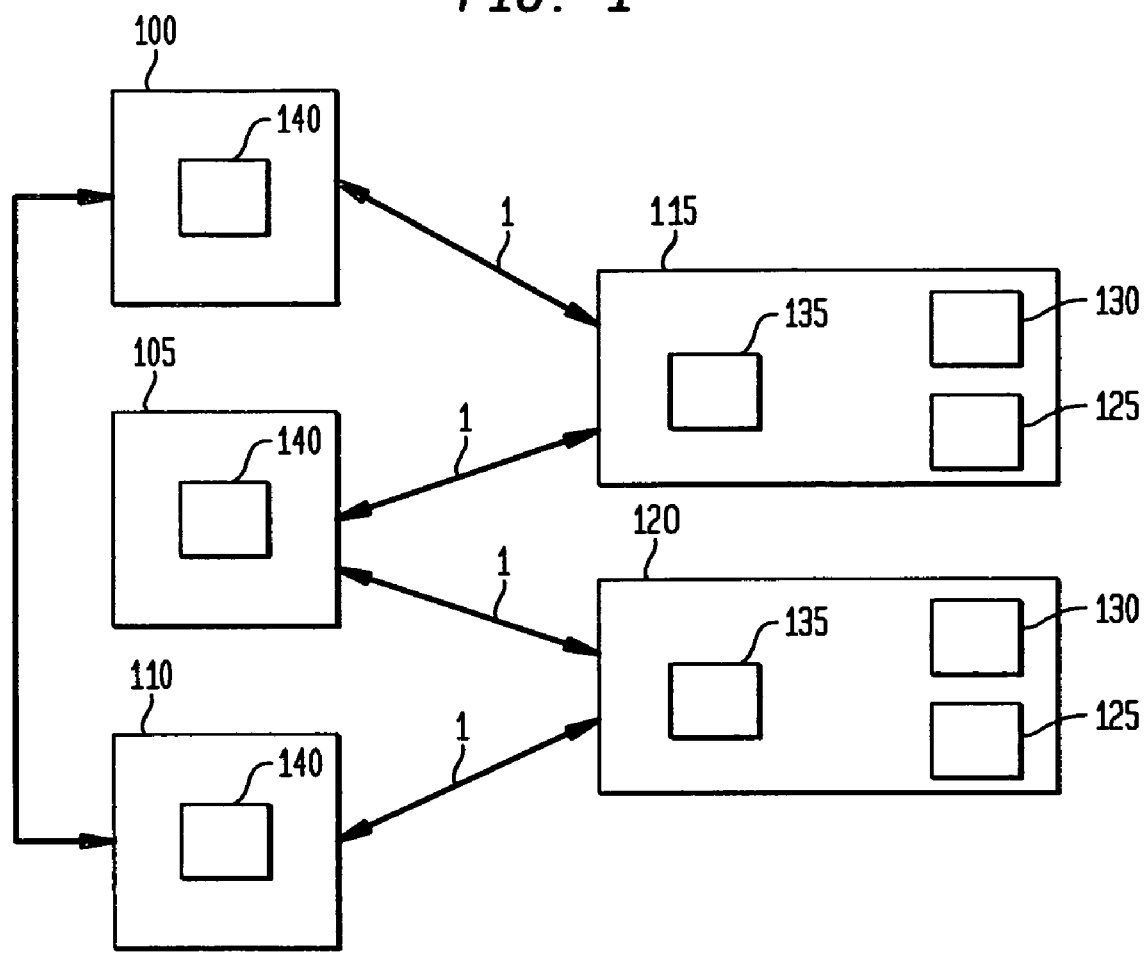
FIG. 1 is an illustration of a client and server environment in which the present invention may be embodied.

FIG. 1 shows a number of mail servers 115, 120 and client devices 100, 105, 110 communicating with each other over a network 1. Each client device 100, 105, 110 comprises email client software 140 for composing, sending and receiving emails from other client devices. The email client software 140 further allows the creation of distribution lists. The client email software 140 interfaces with mailing distribution software 135 on the mail servers 115, 120.

The mail servers 115, 120 each comprise mail distribution software 135 for receiving, processing, storing and queuing emails intended for other clients 100, 105, 110 or servers 115, 120. The mail server 115, 120 may form a single mail domain or form multiple mail domains. Each mail server 115, 120 is coupled to a network for communicating with other mail servers 115, 120 or client devices 100, 105, 110. The mail servers 115, 120 may comprise any mail distribution software 140 that is compatible with an organisation's requirements. The mail servers 115, 120 may comprise a mail transfer agent (MTA) 125 and a mail list manager (MLM) 130 for handling large distribution lists.

Emails may be sent from a client device 100, 105, 110 to a network 1 for receiving by a mail server 115, 120. The network 1 may comprise the Internet, an Intranet, a wide area network, a local area network, a WiFi network or any other type of network for sending and receiving emails or other forms of messages, for example.

Emails may be sent to recipients over a network 1 using the simple mail transfer protocol (SMTP), or other suitable protocol for sending emails or messages. The email is received by a mail relay which refers to a Domain Name Server (DNS) for converting the email address into the network address of the mail server 115, 120 that maintains the recipient's email account. Once this conversion is accomplished a communication link with the mail server 115, 120 is established.

In addition to the MTA 125 located on the mail server 115, 120, the MLM 130 is installed to process each of the recipient's email addresses, as identified within a distribution list. Upon receiving an email associated with a distribution list, the MTA 125 hands over the email, along with the distribution list to the MLM 130. After checking the email, the MLM 130 enumerates the individual recipient's for the list and hands the message with a list of the specific recipients back to the MTA for distribution. The MLM opens a network connection to the MTA, and the MTA queues the email for distribution to all the intended recipients.

A client device 100, 105, 110 may access a mail distribution interface for communication with the mail distribution software on the mail server 115, 120. The mail distribution interface may comprise a web browser interface for uploading the communication and distribution lists created at the client device 100, 105, 110. The communication may take the form of newsletters, corporate announcements, bulletins or any other type of information that is required to be communicated to a large number of recipients.

Figure 2:
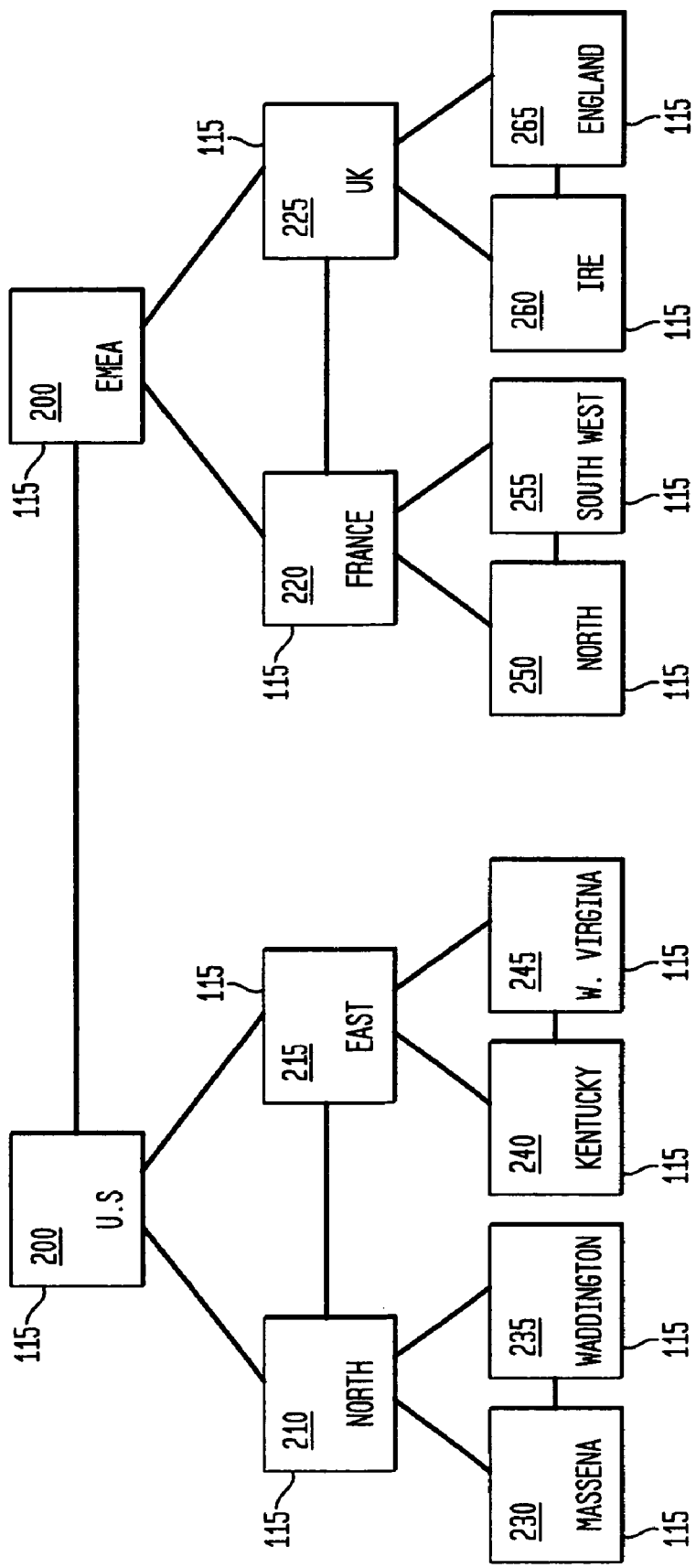
FIG. 2 is a distributed peer to peer environment in which the present invention may be embodied.

In another embodiment of the invention and with reference to FIG. 2, a hierarchical distributed network of mail servers 115, 120 as may be found in a large organisation is shown. Each mail server 115 is responsible for the receiving; processing and transmitting of emails received from other mail servers 115. The network is preferably loosely coupled and is designed to reduce interdependencies across mail servers 115 and the components thereof. A loosely coupled environment increases flexibility in adding mail servers 115 and modifying the operation of the individual components. The network topology may be arranged in a number of ways in which to suit the needs of an organisation. Preferably, within a large organisation the network topology is arranged by country or region specific locations.

As is shown in FIG. 2, the mail servers 115 forming the network topology are segmented by country specific locations. At the highest level are the parent or the root mail servers, for example, U.S and EMEA parent mail servers 200, 205, followed by the child mail servers 210, 215, North and East being child mail servers of the U.S mail server 200 and Massena, Waddington, Ky. and West Virginia being child mail servers of the North and East mail servers 230, 235, 240, 245. The UK and French mails servers being child mail servers 220, 225 of the EMEA mail server and the Ireland and England mail servers being child mail servers 260, 265 of the UK mail server and lastly, the North and South West 250, 255 mail servers being child mail servers of the French mail server 220. It should be noted that a child mail server may also be a parent mail server.

Each parent mail server 210, 215, 220, 225, 200, 205 cooperates with its child mail servers 230, 235, 240, 245, 250, 255, 260, 265 and vice versa. Email messages may be transmitted in an upstream direction from the child mail servers and/or in a downstream direction from the parent mail servers down through the child mail servers.

In another embodiment parent mail servers may cooperate with other parent mail servers and child mail servers may cooperate with other child mail servers as within a peer-to-peer network.

In order to initiate a distribution request for processing by a mail server 115, 120, firstly, a user must initiate a distribution by accessing email distribution software either on the client device 100, 105, 110 or by accessing an email distribution web interface. A mailing profile may be created by launching a profile creator. The mailing profile may comprise information, such as, the name of the sender, address details of the recipients, account details and mailing options, for example, delivery priority, confirmation on receipt, originator display name, reply to name, non delivery report and any security settings. On completion of the created mailing profile, a user is able to create a distribution list. A form is presented to the user comprising input entry fields for the inclusion of a recipients email address. The mailing profile may be modified at any time. On completion of the mailing profile and the distribution list, the mailing profile and the distribution list are submitted to the mailing distribution system as a booking request. The booking request may also comprise a priority rating for a distribution list. The priority order is indicative of the urgency in which the sender wishes the distribution to be sent.

Figure 3:
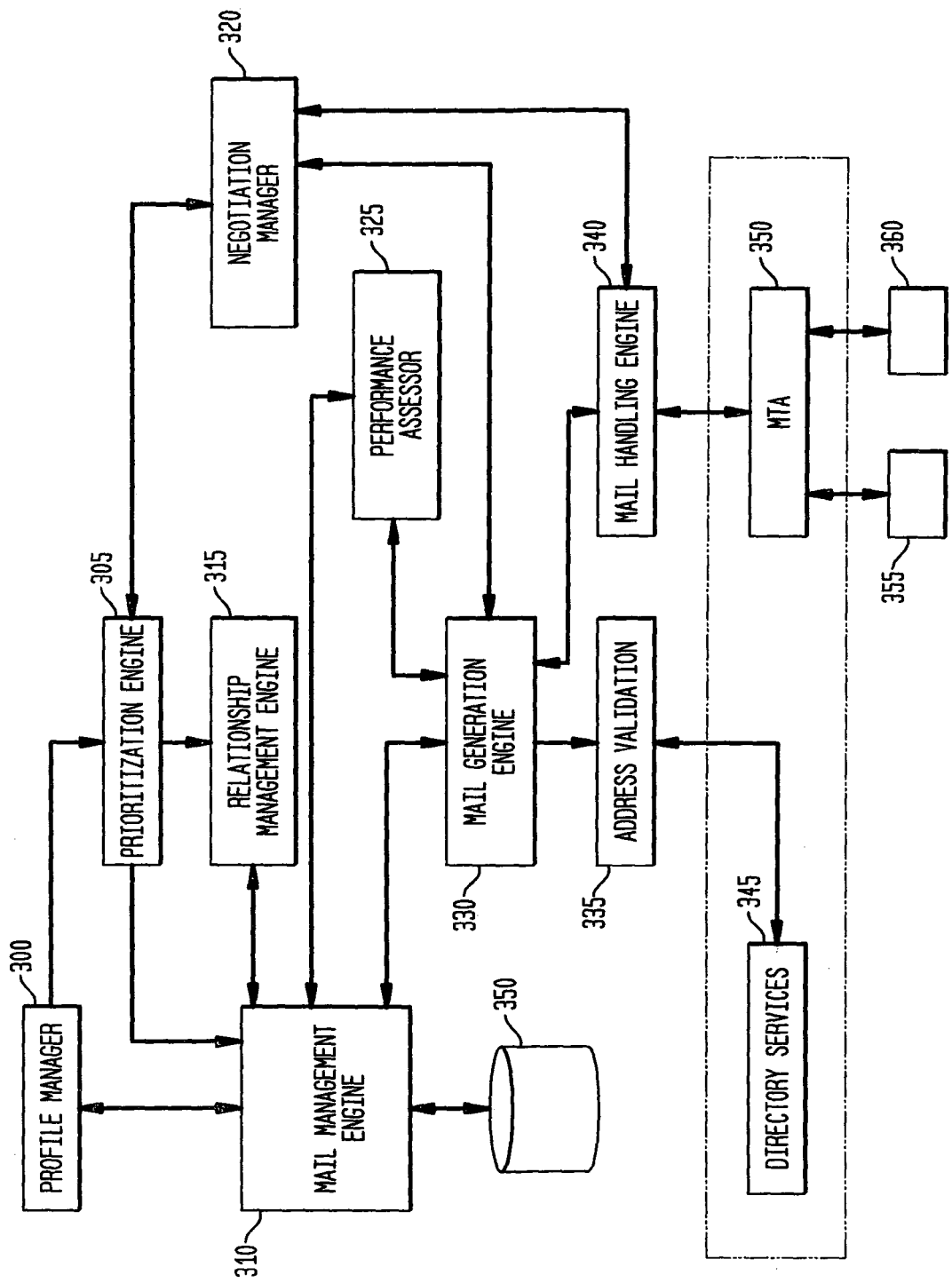
FIG. 3 is a component diagram showing the individual components which comprise the mail distribution system as would reside on a mail server, of the present invention.

FIG. 3 shows the components of the mail distribution system as would reside on a mail server 115, 120, namely a profile manager 300, a prioritisation engine 305, a mail management engine 310 cooperating with a data store 350, a relationship management engine 315, a negotiation manager 320, a mail generation engine 330, a mail handling engine 340 and an address validation engine 330. FIG. 3 further shows a directory service 345, an MTA 350, a performance agent 355 and a mail relay 360, which are known prior art components (denoted by the doted line), but, which the mail distribution system cooperates with for sending emails.

Each of the components of the mail distribution system enhances and modifies the functionality provided by an MLM 130 and the MTA on a mailing server 115, 120. The components can operate in either of the environments described in FIGS. 1 and 2.

On receipt of the booking request, the mail management engine 310, extracts the mailing profile from the booking request and transmits the mailing profile to the profile manager 300, for updating or creating a new mailing profile.

The validation component 335 requests access to each of the email addresses listed within the distribution list for checking whether the recipient's email addresses are valid email addresses and that the destination is a valid mail server 115, 120. This is achieved by performing a cross match between the recipients email address in the distribution list against the recipients email address in a directory service 345. The directory service comprises details concerning demographic details about each email address, each email address' destination server and the mail servers within an organisation's domain. The inclusion of server details allows an administrator of the mailing distribution system to scope the boundaries of the organisations mailing system—thus producing a map of the mail servers 115, 120 and the networks 1 that are coupled to the mail servers 115, 120.

The type of information stored in a directory service may comprise the following:
  Email addresses of recipients and senders
  Type of mail system being used, i.e. POP3, IMAP
  The mail server's mail domain
  Geographical domain of mail server
  IP address of mail server
  IP address of remote gateway
  Server clusters
  Configurations
  Certificate
  Server mail profiles
  Network
  Programs It will be appreciated by a person skilled in the art that other details may be stored and is not limiting to the above list.

The mail distribution system may comprise a plurality of directory services 345, each directory service 345 may be categorised by a demographic domain, for example, U.S, UK, France, Italy, Germany and Japan (reflecting the structure of the peer to peer network, as shown in FIG. 2), or categorised by companies, for example, one directory service 345 may be entitled IBM and further directory services 345 may be categorised by business partners etc. Each of the directory services 345 may be chained together to scope the organisation's mailing domain.

The directory service may further comprises digital certificates and encryption means for verify who a recipient is and who the sender is—thus only sending and receiving from legitimate entities and not entities trying to overload the network by sending spam.

Once a request has been received and the validation component 335 has determined that each email address within the distribution list is a valid email address, the validation component 335 proceeds to analyse the distribution list in order to categorise the distribution list by, for example, geographical regions. How the distribution list is classified is dependent on the classification of the mail servers 115, 120 within the network topology. For example, turning back to FIG. 2, the distribution list may be divided into groups of emails with a destination of the U.S, the north of the U.S, the east of the U.S, EMEA, UK, England, Ireland, France, the south west of France and the north of France. The validation component 335 places the grouped sets of email addresses, along with their delivery priority into a data store for alerting to the mail management engine 310 to continue to process the booking request.

A performance assessor 325 interfaces with a mail monitoring system (not shown). The mail monitoring system sends probes into the network 1. The network 1 is defined by the mail server 115, 120 entries within the directory services 345. The mail probe may ping the various mail servers 115, 120 to determine if the mail server 115, 120 is running, which mail servers 115, 120 are currently performing very slow, which mail servers 115, 120 are using a lot of bandwidth, determining which MAC addresses are the most active and generally determine the overall network traffic for the mail server network, as scoped within the directory service 345.

On receipt of the statistical data generated by the mail monitoring system, the performance assessor 325 determines which mail servers 115, 120 are operating under normal working conditions and can accept further network traffic, without overloading the network and which mail servers 115, 120 are not able at a particular moment in time, to accept further network traffic.

For example, referring back to FIG. 1, a ping command may be sent to server 120, the server responds within an acceptable time frame and with no loss of data packets or an acceptable loss of data packets. Alternatively, server 115 is sent a ping command and responds in an unacceptable time limit. From this statistical data, the performance assessor 325 can assess that server 120 has the capacity to accept further communications, but conversely, it is determined that server 115 does not have the capacity to accept further communications at this particular moment in time. The number of times within a predefined period that a ping command is transmitted to a mail server 115, 120 is variable and can be configured by a system administer. It may be determined that after peak load has been transmitted through the network, a ping command should be sent to determine whether the mail server 115, 120 is still performing within the preconfigured operational boundaries. Alternatively, a ping command may only be sent to a mail server 115, 120 once in the morning, once in the afternoon and then again in the evening. Whenever it is decided to collect or update the statistical information pertaining to each mail server 115, 120, it is important to take the current and projected load of each of the mail servers 115, 120, such that, the individual ping commands do not create unnecessary network traffic and thus overload one or all of the mail servers 115, 120 within the network.

On analysis of the statistical information for each of the mail servers 115, 120, the analysed data is communicated to the mail management engine 310 for transmitting to the prioritisation engine 305.

The mail management engine 310 provides coordination between the activities generated by each of the components within the mail distribution system and monitors each of the components to ensure that they are functioning correctly. The outputs from the profile manager 300, the prioritisation engine 305, the relationship management engine 315, the performance assessor 325, and the mail generation engine 330 are communicated to the mail generation engine 310 for storing in a data store 350.

Moving onto the prioritisation engine 305; the prioritisation engine 305, determines the priority of each of the individual mailings based on the requested time, whether the mailing has been requested as urgent and the availability of the destination mail servers 115, 120. The prioritisation engine 305 embodies a rules engine for parsing the data and matching the data to a set of rules for determining the priority order. Once the priority order has been determined, the prioritisation engine 305 further categorises the mailings by destination mail server 115, 120 and the priority order. For example, taking each of the following queues:

The US Queue abc@ibm.us. com, priority order 1, window Jan. 10, 2004<19:00 def@ibm.us. com, priority order 2, window Jan. 10, 2004>23:00

The UK Queue ghi@ibm.uk. com, priority order 1, window Jan. 10, 2004<02:00 jkl@ibm.uk. com, priority order 3, window Jan. 10, 2004>19:00

The French Queue mno@ibm.france. com, priority order 1, window Jan. 10, 2004<19:00

The Ireland Queue pqr@uk.ire. com, priority order 1, window Jan. 10, 2004<19:00

Each entry within each of the queues comprises the validated email address, the priority order (generated by the prioritisation component) and the preferred timeframe in which the mail should be communicated to the destination server. In this example, a priority order of '1', has a higher precedence than a priority order of '2' or '3' etc, but it will be appreciated by a person skilled in the art that any other arrangement of numerical values will be operable.

Each queue for each mail server 115, 120 is transmitted to the mail management engine 310 for storing in the data store 350 and transmitting to the negotiation manager 320 for negotiating with each of the destination servers 115, 120 a time slot in which to send to each of the mailings.

Taking each of the queues, the negotiation manager 320 communicates with each of the destination servers to determine if the destination server can receive the mailings at a particular time slot.

In one embodiment and referring to FIG. 1, the negotiation manager 320 communicates with servers 115, 120 by sending a message to each of the mail servers 115, 120 identified within each of the queues, requesting if the destination server can accept the payload at a particular time. On receipt of a positive response the negotiation manager 320 sends each of the mailings to the accepting destination server.

On receiving a negative response from a mail server 115, 120, the negotiation manager 320 negotiates a time slot in which the destination server 115, 120 will accept the mailings. The negotiation between a negotiation manager 320 on one mail server 115, 120 and a negotiation manager 320 on another mail server 115, 120 will take into consideration the priority of the payload and the time frame in which the email must be sent.

Each negotiation manager 320 at the same time as negotiating with other negotiation managers 320 in order to book a timeslot for sending its mailings, the negotiation manager 320 will also be negotiating timeslots with other negotiation managers 320 for receiving other negotiation manager's 320 mailings.

In a preferred embodiment and with reference to FIG. 2, each of the mail servers, 115 and 120 are master servers acting as the primary server for the designated region. For example, starting with server 230; server 230 is the master server for the Massena region, server 235 is the master server for the Waddington region and server 240 is the master server for the Kentucky region and so on. Each master server takes responsibility for the mailings sent to their designated region. The mailings will be propagated to the master server of the destination server for processing. A relationship management engine 315 is responsible for defining the relationships between the mail servers 115, 120 within a domain. For example, defining which mail servers 115, 120 are in a client/server relationship and which mail servers define a peer-to-peer relationship. These relationships may be defined by an administrator of the mails distribution system. If a server is removed from, for example, a peer relationship, the information is updated via the relationship management engine 210.

For example, server 260 determines that it has a number of emails to send to a distribution list. The distribution list comprises three email addresses as follows:

1. abc@ibm.us. com, priority order 1, window Jan. 10, 2004<19:00
2. jkl@ibm.uk. com, priority order 3, window Jan. 10, 2004>19:00
3. mno@ibm.france. com, priority order 1, window Jan. 10, 2004<19:00

Email address number 1 has a destination server of the U.S. A rule states that all communication to the U.S must be authorised through the EMEA server. Therefore the email is propagated to the parent master server of 260, i.e. master server 225, which in turn propagates the email to the master server of 225, the EMEA server 205. The EMEA master server 205 on receipt of the email negotiated with the U.S master server for acceptance of the email.

Email address number 2 has a destination server of the UK. As the UK master server 225 is a parent of the master server 260, the email is propagated to the UK master server 225 for transmitting to its local servers.

Email address number 3 has a destination server of France. A rule states that all communication to France must be authorised through the UK server. Therefore the email is propagated to the parent master server of 260, i.e. master server 225. In this instance master server 225 is the peer master server of master server 220 (France). The UK master server 225 therefore negotiates directly with the French master server 220.

Finally, the mail-handling engine 340 cooperates with the MTA to transmit to each identified mail server 115, 120, the prioritised and negotiated emails pertaining to a distribution list.

Figure 4:
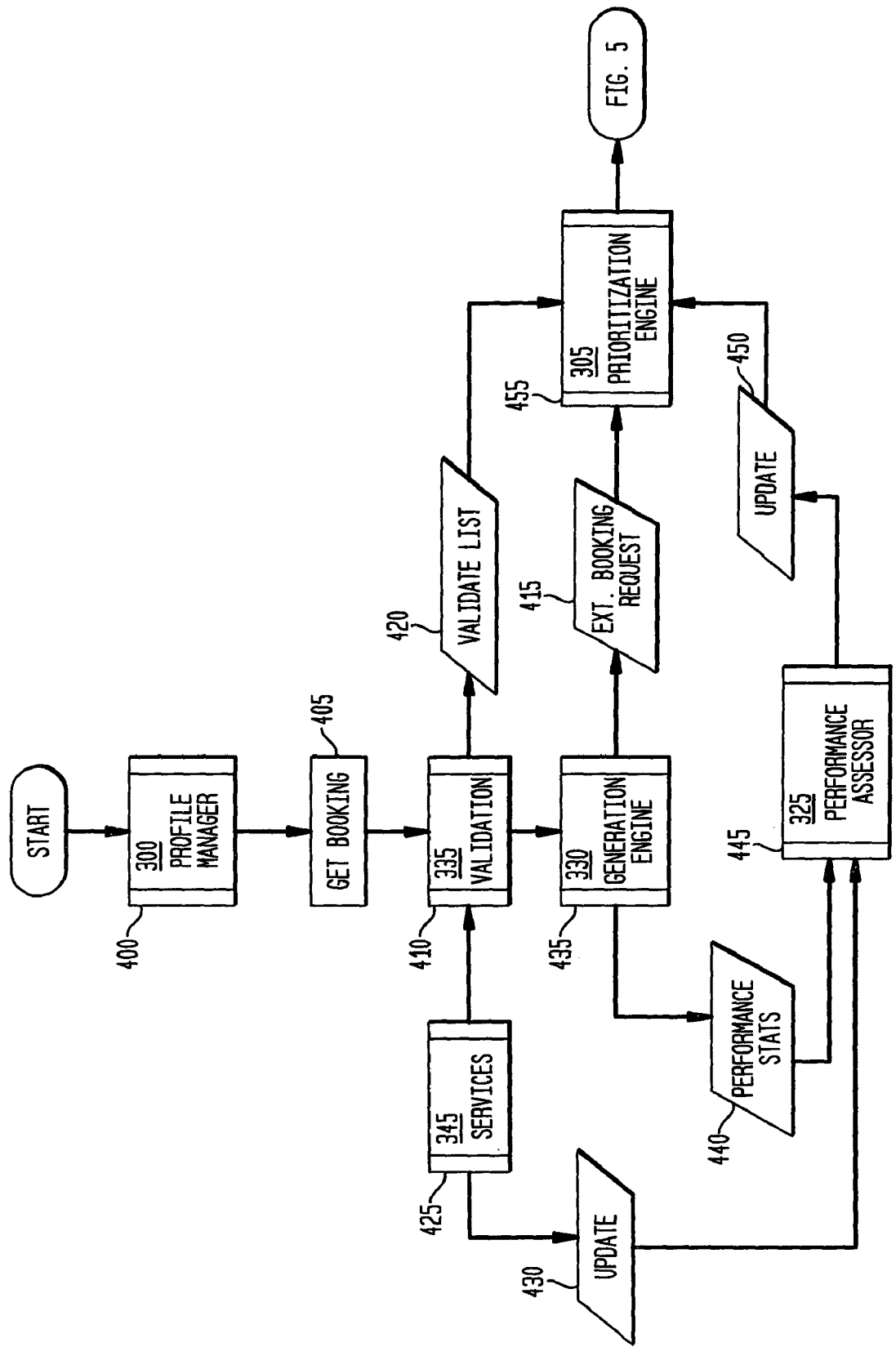
FIG. 4 is a flow chart detailing a high level overview of the operational steps of the mail distribution system of the present invention.
Figure 5:
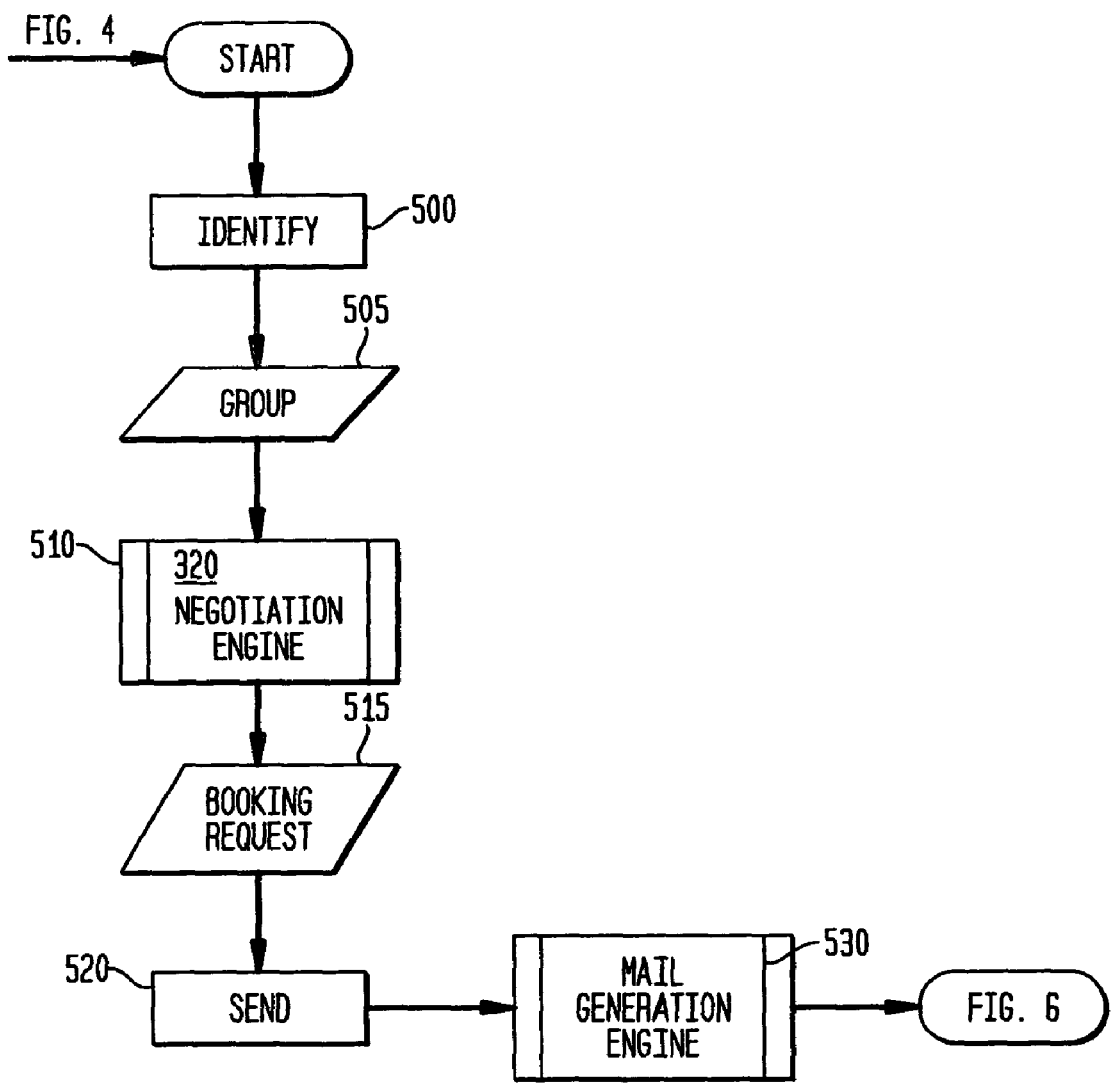
FIG. 5 is a continuation of the flow chart of FIG. 4.
Figure 6:
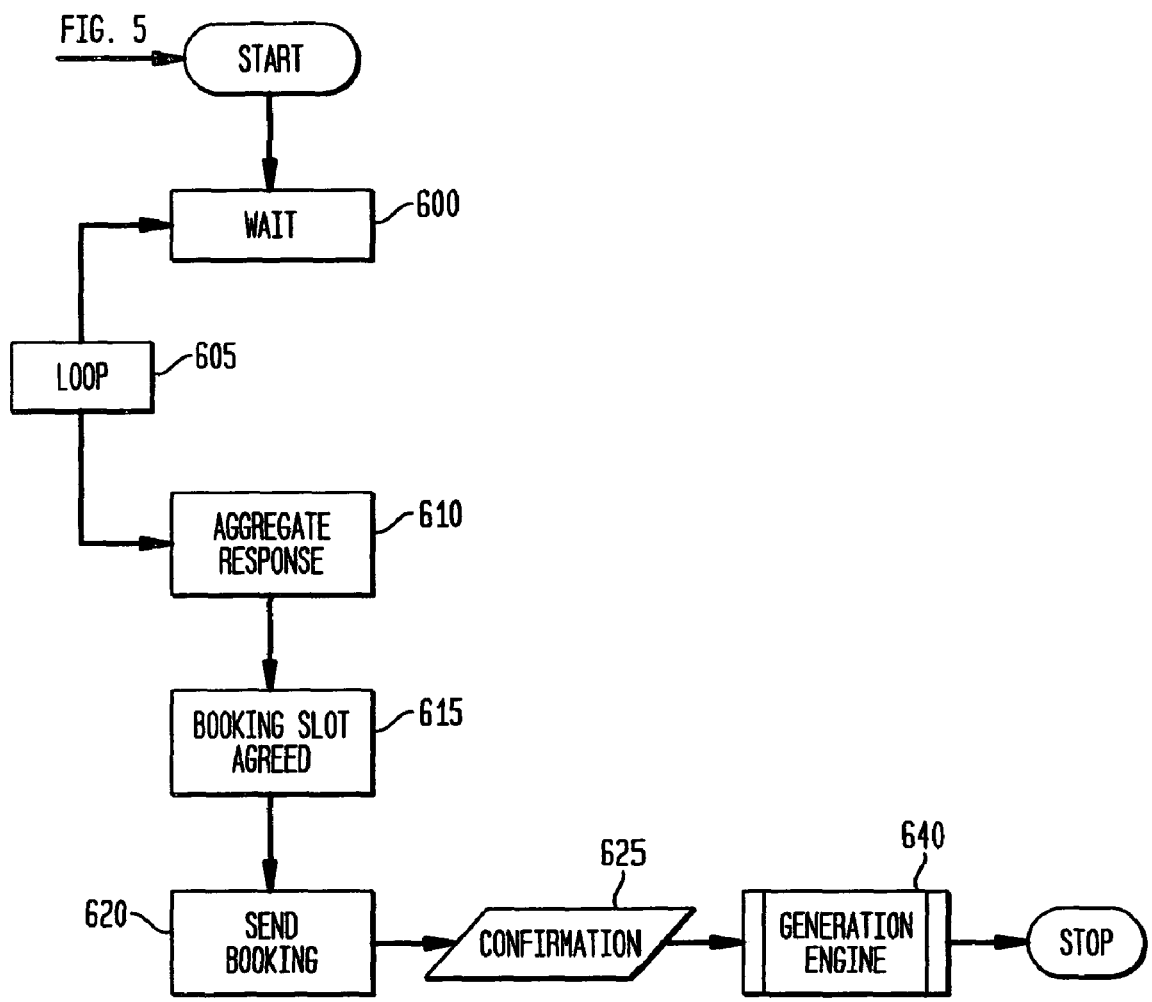
FIG. 6 is a continuation of the flow chart of FIG. 5.

Moving onto FIG. 4, FIG. 5 and FIG. 6, the operational steps of the mail distribution system are shown. Firstly referring to FIG. 4, the profile manager 300 transmits a booking request from the mailing profile at step 405. The booking request comprises the email addresses of each recipient listed within the distribution list, their attributes and the content of the email to be sent, is received by the validation engine 335, for validation of each email address at step 335. The validation engine 335 performs a check to determine whether each email address is a valid email address by performing a lookup in a directory service 345. Once each email address is validated, the validation component 335 creates a list of validated email addresses, along with each validated email's destination and mailing domains (extracted from the mailing profile) at step 420. The validated list is transmitted to the prioritisation engine 305 for prioritising in the order in which each of the mailings should be sent to each of the recipients at step 455.

The prioritisation engine 305 on receiving the validated list determines whether the mail generation engine 310 has received an external booking request from another server 115, 120, for example, another master server, a slave or a peer at step 415. In parallel the mail generation engine 310, transmits received performance statistics to the performance assessor 325 pertaining to each destination server 115, 120 for analysis at step 440. The performance assessor 325 requests the latest performance statistics from the monitoring system in order to update that the statistics stored in a data store for analysis and use by the other components.

Moving onto FIG. 5, the prioritisation engine 305 on receiving the inputs, at steps 420 and 450 of FIG. 4, proceeds to identify the target mail servers 115, 120 responsible for processing the distribution of the email to the recipients, at step 500. On identification of the destination mail servers 115, 120 the recipients are grouped based on their target domains and by their priority order at step 505. The groups are transmitted to the negotiation manager 320 for negotiating a time slot with each of the recipient mail servers 115, 120 at step 510. At step 515, a booking request is generated for sending to the mail generation engine for sending to each of the destination mail servers 115, 120. The mail generation engine 330 at step 600 of FIG. 6 sends each of the destination mail servers 115, 120 the booking request and enters a loop and waits for a response from a predetermined number of mail servers 115, 120. It is advisable to allocate how many mail servers 115, 120 should be allocated to respond to the negotiation manager 320 before an action is performed, in order to avoid unnecessary delays.

As responses are received, the mail generation engine 330 aggregates each of the responses and determines whether the destination mail server 115, 120 has agreed to the date and time contained within the booking request, at step 615, or whether a new time must be renegotiated with the negotiation manager 320, at step 615. If a renegotiation is determined a response is sent to the negotiate manager 320 to negotiate a new time and a new booking request. Alternatively, if a booking request is accepted by the target mail server, the grouped distribution lists along with the email content is transmitted at step 625.

Figure 7:
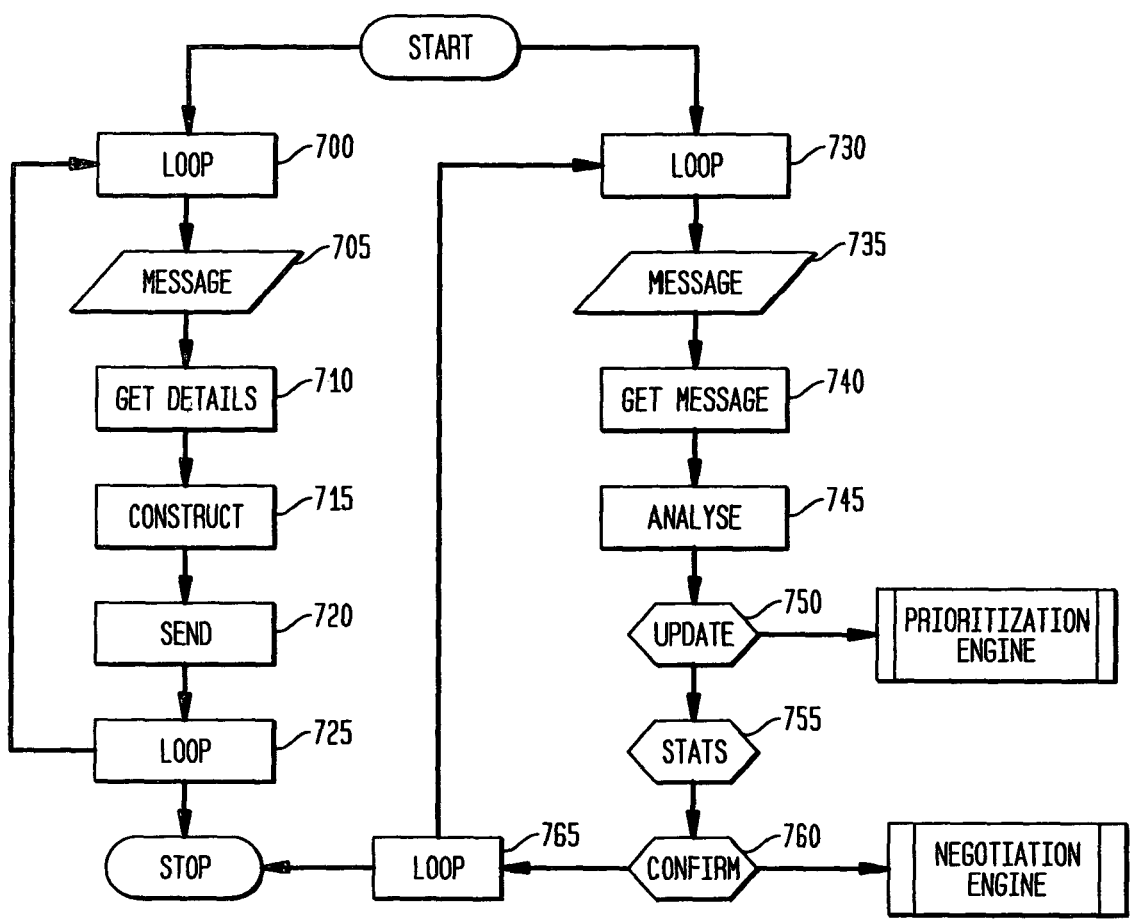
FIG. 7 shows a flow chart detailing the operational steps of the mail handling process of the mail distribution system of the present invention.

Moving onto FIG. 7, the operational steps of the mail handling process is shown. On initiation of a booking request, at step 700, mail distribution system enters into a loop function. At step 705, if the mailing is an internal mailing i.e. within the mail server's 115, 120 domain, the information regarding the mailing is retrieved and the mailing is constructed i.e. grouped and prioritised, at step 715 and step 710. At step 720, the mailing is sent to the identified destination mail servers 115, 120.

Moving onto step 730, if the mailing is identified as an external mailing, the information regarding the mailing is retrieved from the input queue, at step 735 and step 740. At step 745, the mailings are analysed and grouped by their destination mailing servers 115, 120 and by their priority order. A determination is made as to whether the booking request is an update to an existing booking request or it is a new booking at step 750. A request is made at step 755 to determine whether performance statistics have been updated since a previous request. If the statistics (updated or not) are sent to the prioritisation engine 305, along with the booking requested for prioritisation at step 755. The prioritised groups are placed in a queue for accessing by the negotiation manager 320. The negotiation manager parses the queue and extracts the priority orders, destination mail servers 115, 120 and the time slots for each mailing and proceeds to contact the identified mailing slots for negotiating a time slot in which to send the mailings at step. On completion of a successful negotiation the destination mail servers returns a confirmation message indicating the negotiated time slot, at step 760.

Figure 8:
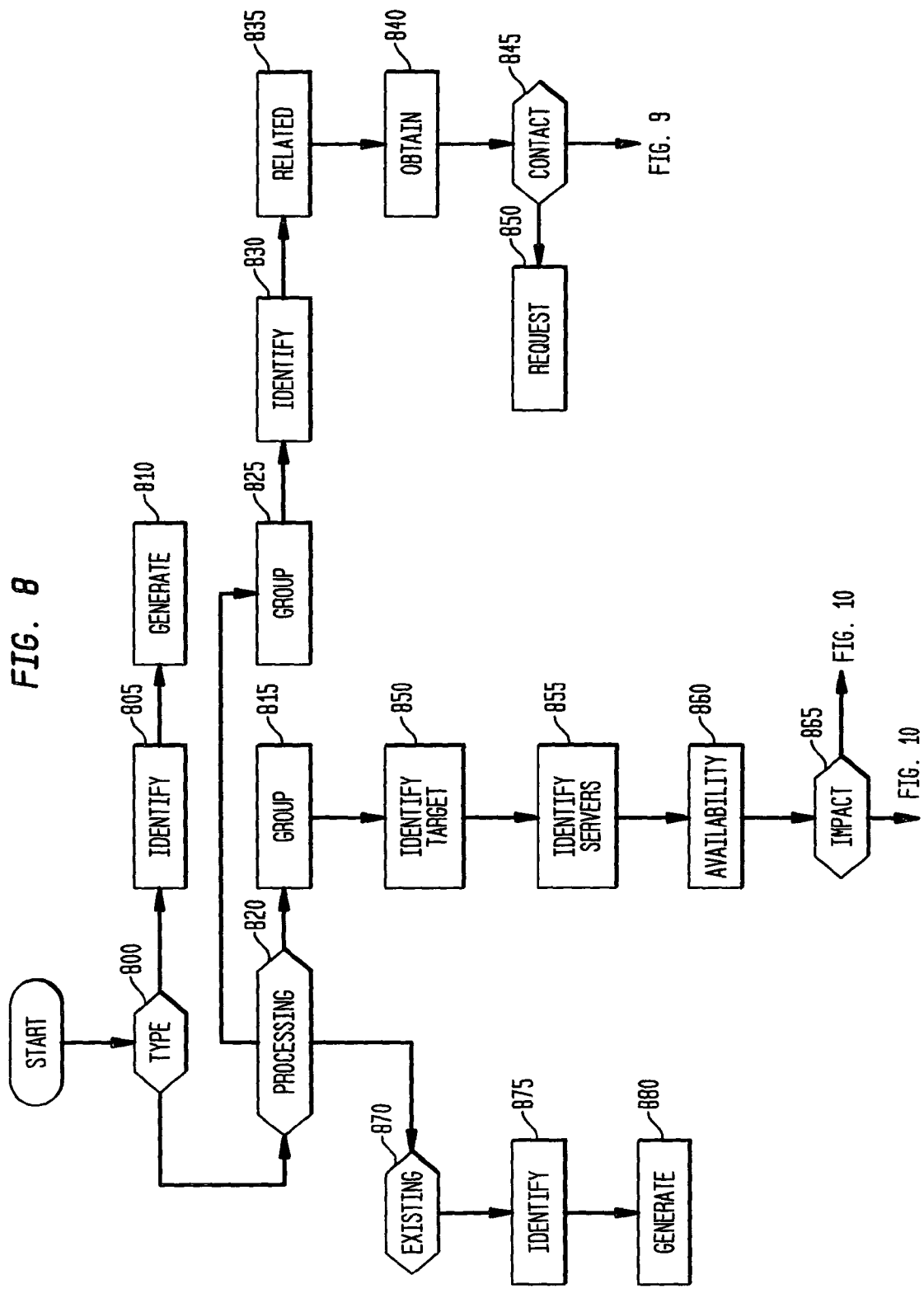
FIG. 8 details the operational steps of the prioritisation manager of the mail distribution system of the present invention.

Referring now to FIG. 8 the operational steps of the prioritisation engine 305 are shown. At step 800, a determination is made by the prioritisation manager 305, whether the booking request is for a change, an addition or a deletion of a booking request. If the request is for a deletion of a booking request, control moves to step 805 and the master, slave or peer servers pertaining to the deletion are identified and a delete booking requests are generated for sending to the identified servers at step 810.

Moving back to step 800, if a determination is made to add a new booking request, control moves to step 825 and each of the email addresses contained within the booking request are grouped according to their destination mail server 115, 120. Next at step 830, each of the destination mail servers 115, 120 which are required in order to deliver the emails are identified. A further determination is made at step 835 to identify the related master and peer servers responsible for the delivery to the grouped recipients and the destination mail servers 115, 120.

At step 840, the prioritisation engine 305 obtains the availability information for each of the servers identified within the scoped domain. Control moves to determination 845 and a determination is made to establish whether there are any master or slave servers that should be contacted to add the new booking request. If a positive determination is made, a booking request is generated and transmitted to the mail generation engine 330 for sending.

Moving back to determination 820, if the determination is for a change to an existing booking, the recipients are grouped by their destination servers at step 815. On completion of step 815, the destination mail servers 115, 120 required to deliver the mailings are identified at step 850 and the related master, slave or peer servers are identified at step 855. At step 860, the performance statistics for each of the destination servers 115, 120 identified as part of the scoped mail domain is requested at step 860. A determination is made at step 865, to determine if the booking request affects the identified servers within the scoped mail domain.

Figure 9:
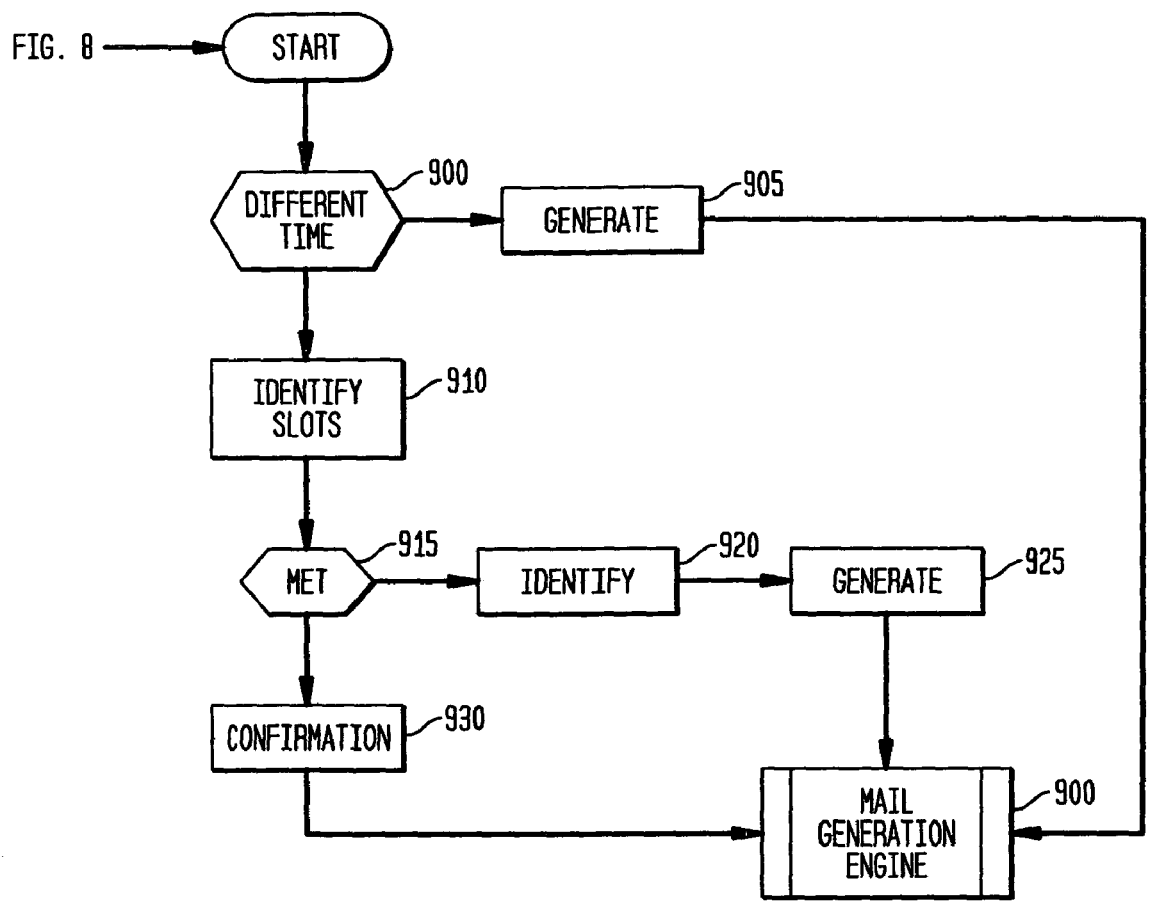
FIG. 9 is a continuation of the flow chart of FIG. 8.

Moving onto FIG. 9, the prioritisation engine 305 determines whether the mailings can be sent at a different time to the time requested within the mailing profile at step 900. If the determination is positive, control moves to step 910 and a further determination is made to identify alternative booking slots. Conversely, if the determination is negative, control moves to step 905 and a number of common booking slots are identified that is within the scope of the original booking slot. Moving back to control 915, a determination is made to identifying all available booking slots for each of the mail servers 115, 120 within the mail domain and generate a response message once a booking slot has been agreed, at step 920 and 925, for sending to the mail generation engine 330.

Figure 10:
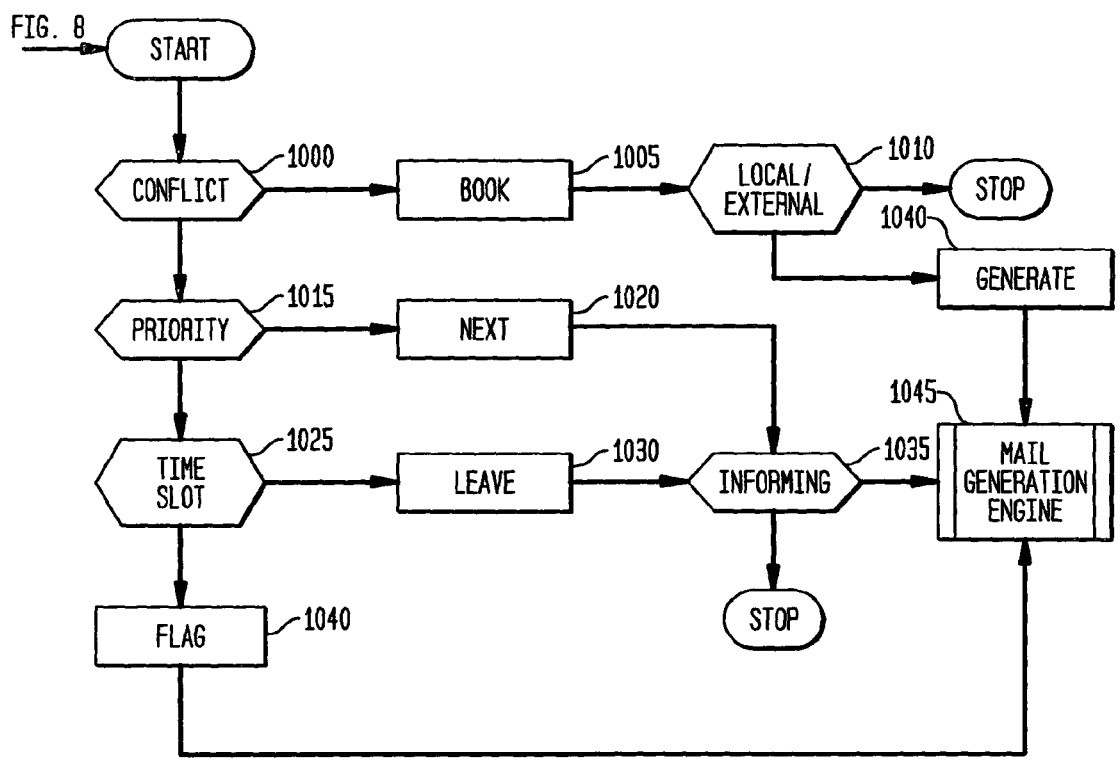
FIG. 10 is a continuation of the flow chart of FIG. 8.

With reference to FIG. 10, a further determination is performed at step 1000, to identify whether the requested booking conflicts with a target mail server outage. If the response is negative, control moves to step 1005 and the mailing slot is booked with the identified destination mail servers 115, 120. A further determination, at step 1010, is performed to decide as to whether the change to the booking request is to a server 115, 120 within the identified scoped domain or whether to a server not identified as within the scoped domain. If it identified that the booking is to a local server, the booking slot is booked. If the change affects an external server, a booking confirmation message is generated and transmitted to the mail generation engine for sending at step 1040.

Moving back to control 1000, if a positive determination is made and the mailing does conflict with another booking request or a known server outage, control passes to step 1015 and a determination is made as to whether the priority order of the new booking request is greater than the priority order of an existing booking request. If the determination is positive, a further determination is performed to identify whether the existing time slot can be met, at step 1025. If it can, the existing booking is left (step 1030) and the new booking is confirmed. If the determination is negative the existing booking is flagged as pending a rebooking at step 1040 and communicated to the mail generation engine 310.

Figure 11:
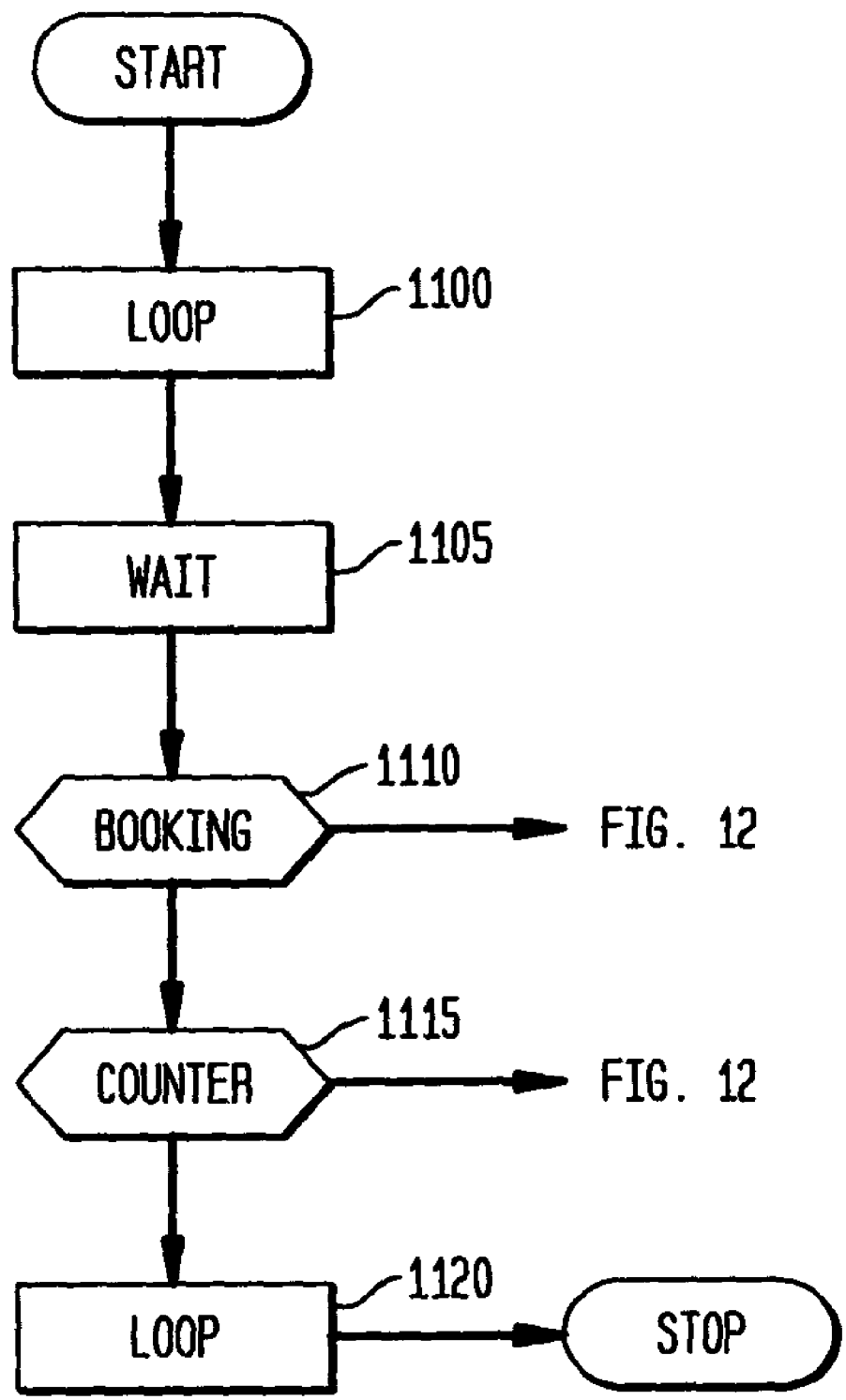
FIG. 11 shows a flow chart detailing the operational steps of the negotiation engine of the mail distribution system of the present invention.
Figure 12:
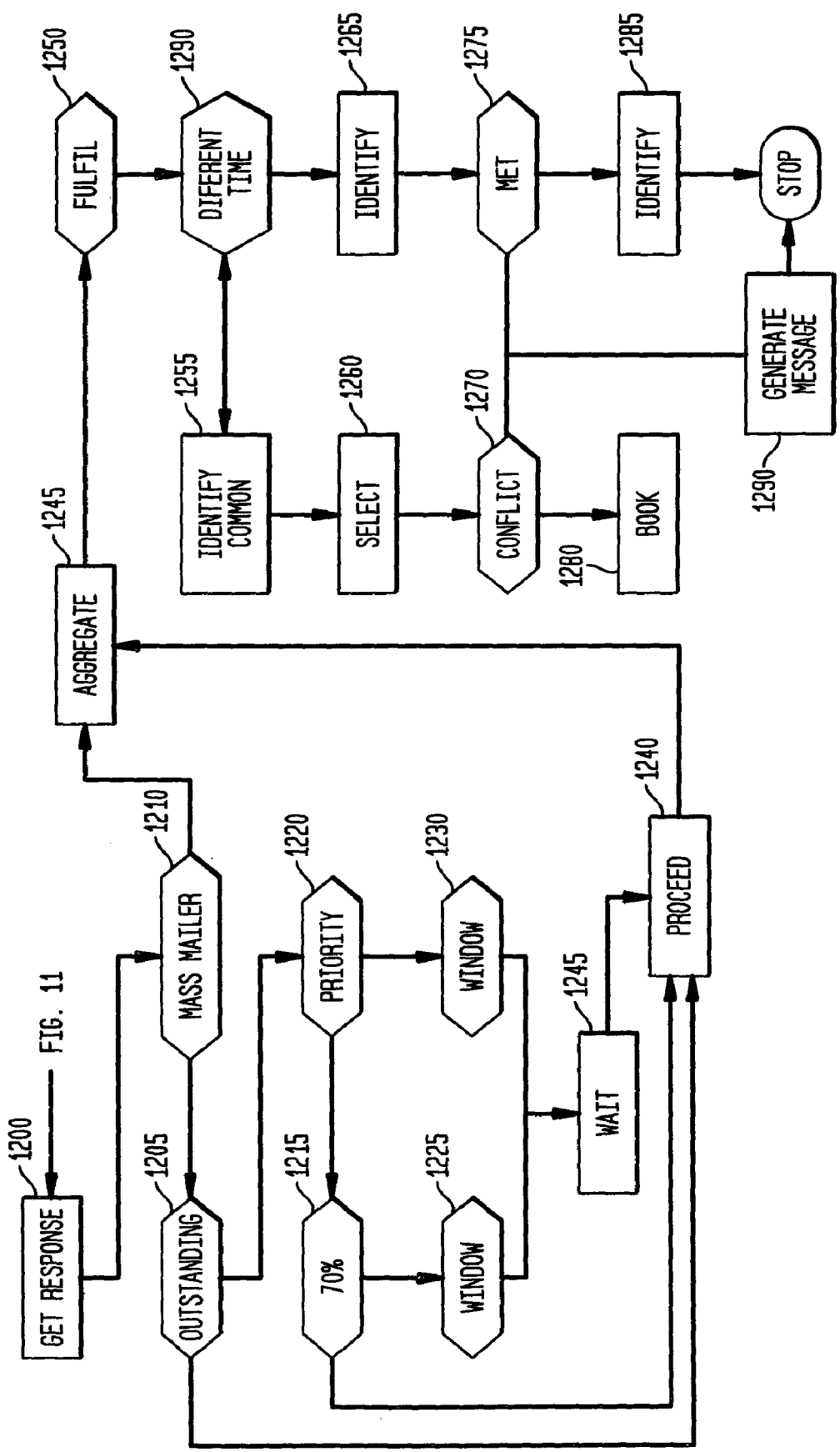
FIG. 12 is a continuation of the flow chart of FIG. 11.

Moving onto FIGS. 11 and 12, the operational steps of the negotiation manager 320 are explained. FIG. 11 details a high level over view of the operational steps of the negotiation manager 320 and FIG. 12 explains each of the steps in more detail.

At step 1100 of FIG. 11, a loop function is initiated and the negotiation manager 320 waits for an inbound message from the mail generation engine 330. On receipt of the message the negotiation manager 320 proceeds with negotiating a time slot with each of the destination mail servers 115, 120. Once a booking request has been sent, the negotiation manager 320 waits for a response from a predetermined number of destination mail servers 115, 120 and depending on the received response either, renegotiates a booking slot, at step 1100, or continues to book the slot within the agreed time period at step 1120.

Moving onto FIG. 12, on receiving a response at step 1200, the negotiation manager 320, determines (step 1210) how many more mail servers 115, 120 it should communicate with in order to fulfill the requirements of the booking request at step 1205. If a response has been received and there are no more mail servers 115, 120 to communicate with, all the responses are aggregated for each of the confirmed timeslots at step 1245. If all of the received responses indicate that all bookings can be fulfilled at the originally requested time, a conformation message is generated and transmitted to each of the identified target mail servers at step 1250. Moving back to step 1210, if it is determined that there is more than one target mail server to respond to, a further determination is made to determine whether the negotiation manager is awaiting any further responses from other target mail servers at step 1105. If the determination is positive, the negotiation manager 320 determines if the booking request has a status of a high priority (step 1220).

If the determination is positive, a further determination is made as to whether the booking request can be met, for example, if it is of a high priority, or the mailing must be sent the next day, it is possible that the booking request can be met within such a short time scale (step 1230). If the determination is negative the negotiation manager 320 proceeds to the next step of the negotiation process at, step 1245. If the determination is positive the negotiation manager 320 awaits further responses. In this instance control moves to step 1245, and once again the negotiation manager 320 aggregates all of the responses and determines whether the responses indicate whether the booking can be fulfilled as per the original booking at step 1250. If the determination is negative, a determination is made as to whether the mailing can be sent at a different time to the requested time. If the response is positive, the negotiation manager identifies the options for each booking and for each destination server 115, 120, at step 1265. A further negotiation is undertaken to determine whether the newly proposed time slot is able to be met. If the response is negative, further time slots are identified at step 1285. This process continues until an agreed time slot can be met. If the mailing is of a high enough priority, the mailing may be forced, or if the mailing cannot be met, a negative response may be sent to the requester.

Moving back to control 1290, if the mailings cannot be sent at a different time, control moves to step 1255 and the common booking slots across all target servers within the scoped domain are identified. The negotiation manager 320 in response to the identifying step proceeds to select the best common slot, which the majority of destination mail server 115, 120 can meet, at step 1260. A further determination is made to determine if the mailing conflicts with another mailing, at step 1270. If the response is negative, the mailing slot is booked. If the response is positive, a further negotiation takes place to identify free slot. After a predetermined amount of negotiation steps in which no agreed time is being negotiated, the negotiation manager 320 enforces a forced booking and the mailing is sent.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for determining a time period in which to send an email to a plurality of email addresses, each of the email addresses being associated within a distribution list and the email being sent to at least one destination server associated with each of the email addresses, the method comprising:

receiving, via a user interface from a user, a plurality of email addresses associated with the distribution list, each email address comprising an attribute, the attribute pertaining to a requested time period in which to send the email to each of the email addresses;

for each email address, identifying the destination server based on said each email address and requesting performance metrics indicative of the capacity of the identified destination server to receive the or each of the emails;

analysing each of the performance metrics to determine whether, the identified destination server is able to receive each of the emails within the requested time period; and in dependence of the identified destination server not being able to receive each of the emails, negotiating a time period in which the identified destination server can receive each of the emails, wherein, on receiving a plurality of email addresses associated with the distribution list via the user interface from the user, before sending an email or a request to each of the email addresses, each email address associated with the distribution list is matched against a list of email addresses stored in a directory service to ensure that each of the email addresses associated with the distribution list is a valid email address.

2. A method as claimed in claim 1 wherein on identifying the destination server, a determination is performed to identify whether, the identified destination server is part of an identified mail domain.

3. A method as claimed in claim 2, wherein the identified mail domain is defined by a directory service.

4. A method as claimed in claim 2, wherein the identified mail domain identifies which destination servers the performance metrics are requested from.

5. A method as claim 1, wherein on identification of the destination server, a determination is performed to determine a priority order for each of the email addresses, in response to a requested priority and the identified destination server.

6. A method as claimed in claim 1 wherein on negotiation of an alternative time period, a message is transmitted to the destination server requesting an available time period of the destination server.

7. A method as claimed in claim 6, wherein after a predetermined number of unsuccessful attempts at requesting an available time period, the email is sent to each of the plurality of email addresses.

8. A system for determining a time period in which to send an email to a plurality of email addresses, each of the email addresses being associated within a distribution list and the email being sent to at least one destination server associated with each of the email addresses, the system comprising:
- a receiver component, receiving, via the user interface from the user, a plurality of email addresses associated with the distribution list, each email address comprising an attribute, the attribute pertaining to a requested time period in which to send the email to each of the email addresses;
- a prioritisation engine for identifying for each email address based on each email address, the destination server and requesting performance metrics indicative of the capacity of the identified destination server to receive each of the emails;
- the prioritisation engine analysing each of the requested performance metrics to determine whether, the identified destination server is able to receive each of the emails within the requested time period; and
- a negotiation component for negotiating a time period in which the identified destination server can receive each of the emails, in dependence of the identified destination server not being able to receive each of the emails,
- wherein, on receiving a plurality of email addresses associated with the distribution list via the user interface from the user, before sending an email or a request to each of the email addresses, a validator component matches each email address associated with the distribution list against a list of email addresses stored in a directory service to ensure that each of the email addresses associated with the distribution list is a valid email address.

9. A system as claimed in claim 8 wherein on identifying the destination server, a validator component determines whether the identified destination server is part of an identified mail domain.

10. A system as claimed in claim 9, wherein the identified mail domain is defined by a directory service.

11. A system as claimed in claim 8, wherein the identified mail domain identifies which destination servers the performance metrics are requested from.

12. A system as claimed in claim 8, wherein on identification of the destination server, the prioritisation engine determines a priority order for each of the email address, in response to a requested priority and the identified destination server.

13. A system as claimed in claim 8 wherein on negotiation of an alternative time period, the negotiation component generates a message for transmitting to the destination server requesting an available time period of the destination server.

14. A system as claimed in claim 13, wherein after a predetermined number of unsuccessful attempts at requesting an available time period, the negotiation manager transmits the email to each of the plurality of email addresses.

15. A computer program product comprising a storage device comprising software code portions, loadable into an internal memory of a digital computer, for determining a time period in which to send an email to a plurality of email addresses, said software code portions performing, when said product is run on the digital computer, the method of claim 1.

16. A method of deploying a computer program product for determining a time period in which to send an email to a plurality of email addresses, each of the email addresses being associated within a distribution list and the email being sent to at least one destination server associated with each of the email addresses, comprising:
- installing the computer program product in a computer, wherein when the computer program product is run by the computer, the computer performs steps of:
- receiving, via the user interface from the user, a plurality of email addresses associated with the distribution list, each email address comprising an attribute, the attribute pertaining to a requested time period in which to send the email to each of the email addresses;
- for each email address, identifying the destination server based on each email address and requesting performance metrics indicative of the capacity of the identified destination server to receive each of the emails;
- analysing each of the performance metrics to determine whether, the identified destination server is able to receive each of the emails within the requested time period; and
- in dependence of the identified destination server not being able to receive each of the emails, negotiating a time period in which the identified destination server can receive each of the emails,
- wherein on receiving a plurality of email addresses associated with the distribution list via the user interface from the user, before sending an email or a request to each of the email addresses associated with the distribution list, each email address associated with the distribution list is matched against a list of email addresses stored in a directory service to ensure that each of the email addresses associated with the distribution list is a valid email address.

* * * * *